(12) United States Patent
Takahashi et al.

(10) Patent No.: US 7,489,871 B2
(45) Date of Patent: Feb. 10, 2009

(54) LIGHT DETECTION APPARATUS AND FREE SPACE OPTICS COMMUNICATION APPARATUS

(75) Inventors: Yasuhiro Takahashi, Saitama-ken (JP); Ryuji Ohmuro, Tochigi-ken (JP); Tetsuo Sakanaka, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 579 days.

(21) Appl. No.: 11/007,364

(22) Filed: Dec. 8, 2004

(65) Prior Publication Data
US 2005/0141897 A1    Jun. 30, 2005

(30) Foreign Application Priority Data
Dec. 10, 2003 (JP) .............................. 2003-412522

(51) Int. Cl.
*H04B 10/00* (2006.01)
(52) U.S. Cl. ...................................... 398/129; 398/131
(58) Field of Classification Search ......... 398/118–131; 385/33, 31
See application file for complete search history.

(56) References Cited

U.S. PATENT DOCUMENTS

| 5,627,669 A | 5/1997 | Orino et al. |
| 6,956,992 B2 * | 10/2005 | Coleman ..................... 385/33 |

\* cited by examiner

*Primary Examiner*—Quan-Zhen Wang
(74) *Attorney, Agent, or Firm*—Morgan & Finnegan, L.L.P.

(57) ABSTRACT

A free space optics communication apparatus which performs optical axis correction with high accuracy is disclosed. The free space optics communication apparatus of the present invention includes a first light receiving element and a second light receiving element, a light converging optical system which converges a light flux incident from the outside to form a spot of the light flux on each of light receiving surfaces of the first and second light receiving elements, and information producing section which combines outputs from the first and second light receiving elements to produce information on positions of the spots. The spots formed on the light receiving surfaces of the first and second light receiving elements have a point-symmetrical relationship.

5 Claims, 11 Drawing Sheets

LIGHT DETECTION APPARATUS AND FREE SPACE OPTICS COMMUNICATION APPARATUS

BACKGROUND OF THE INVENTION

1. Field of the Invention

The present invention relates to a free space optics communication apparatus which is provided at each of two spaced points in opposition to each other to perform communication by transmitting an optical signal through a light beam propagating in free space, the apparatus having a function of correcting the optical axis of a light beam to deal with an angle change of the apparatus.

2. Description of Related Art

A free space optics communication apparatus which generally propagates a light beam in free space to perform communication needs to transmit a narrow light beam with a minimized divergent angle in order to efficiently transmit the power of light. A narrower light beam, however, is susceptible to swinging due to wind pressure or vibrations in a building or a support member, distortion because of temperature changes, angle variations due to changes over time and the like, so that the light beam is likely to miss a target apparatus and stable communication is difficult to achieve. To address this, as shown in FIG. 13, a proposed apparatus has a function of correcting optical axis displacement by correcting an angle change of the apparatus, if any, to direct the light beam to a target apparatus at all times.

FIG. 13 shows a schematic diagram of a free space optics communication apparatus which performs optical communication with a target apparatus, not shown. In FIG. 13, reference numeral 100 shows an optical system for transmitting and receiving a light beam. Light for transmission to the target apparatus is emitted from a light emitting element 210 such as a semiconductor laser. The light for transmission emitted from the light emitting element 210 is polarized and the polarization direction is set to be parallel with the paper. The light polarized in this direction is reflected by a polarization beam splitter 220 toward a light transmission/reception lens 230 which changes the light into a generally collimated light beam 240 with slight divergence before the beam 240 is transmitted toward the target apparatus.

On the other hand, received light transmitted from the target apparatus reversely follows the path on the same optical axis as that of the transmitted light from the free space optics communication apparatus and is incident on the polarization beam splitter 220 through the light transmission/reception lens 230. Since the polarization direction is set to be orthogonal to that of the transmitted light (the polarization direction is perpendicular to the paper), the light passes through the polarization beam splitter 220 and enters a beam splitter 250.

Most of the received light is reflected by the beam splitter 250 and is incident on a light receiving element 260 for light signal detection to detect a signal for communication. Some of the received light, however, passes through the beam splitter 250 and is incident on a light position detecting element 270.

The light position detecting element 270 is realized, for example, by a photodiode divided into four as shown in FIG. 14A. FIG. 14A shows a light spot 42 applied to the photodiode divided into four from 27a to 27d.

The light position detecting element 270 outputs a signal in accordance with the distribution of the light intensity in the spot formed on a light receiving surface, and the outputs from the four photodiode portions 27a to 27d are compared. The position of the light spot 42 can thus be found.

Another type of the light position detecting element is a special photodiode for detecting the position of a light spot, generally called a PSD as shown in FIG. 14B, for example. For the PSD, the vertical position of the light spot 42 can be found by comparing a voltage across terminal Y1 with a voltage across terminal Y2, while the horizontal position of the light spot 42 can be found by comparing a voltage across terminal X1 with a voltage across terminal X2.

The signal output from the light position detecting element 270 is arithmetically processed as angle correction information by a control circuit 280 and a drive signal is output to a drive circuit 290 for the optical system 100. The drive circuit 290 drives a drive mechanism 300 which drives the optical system 100 in a vertical direction and a drive mechanism 310 which drives the optical system 100 in a horizontal direction to correct the optical axis such that the position of the light spot 42 is shifted to the center of the light position detecting element 270. In the example shown in FIG. 14A, the optical system 100 is driven in a direction in which all the outputs from the four photodiode portions 27a to 27d are equal.

All of the light position detecting element 270, the light emitting element 210, and the light receiving element 260 for light signal detection have been subjected to position adjustments to align their optical axes. When the light spot 42 is applied to the center of the light position detecting element 270, the received light is also incident on the center of the light receiving surface of the light receiving element 260 for light signal detection, and the center of the light from the light emitting element 210 is directed toward the target apparatus. In this manner, the correction of optical axis displacement is performed such that the transmitted light is sent in the direction of the received light, that is, toward the target apparatus, at all times.

When the light position detecting element 270 is used for position detection, the output sensitivity to a position change depends on the area of the spot 42 formed on the light receiving surface in the example of FIG. 14A. It is desirable for the light receiving spot 42 to have an appropriate area in order to prevent a sudden change in the output when any border between the four photodiode portions 27a to 27d is crossed and to provide proper position sensitivity.

In the example shown in FIG. 14B, since the size of the spot for which operation is guaranteed is defined by limitations in the specifications of the PSD, the area of the spot on the light receiving surface cannot be reduced significantly. Thus, the light receiving surface of the light position detecting element 270 is generally set at a position shifted from a light convergent point.

The free space optics communication apparatus which transmits/receives light through the air in the aforementioned conventional example, however, is affected by the phenomenon of the light beam waving due to fluctuations of the air. The air fluctuations are classified broadly into two, that is, macro fluctuations which cause the waving of the whole light beam, and micro fluctuations which cause non-uniform distribution of intensity within a transmission beam. Of these air fluctuations, the macro fluctuations of the air can have less influence by increasing the diameter of a transmission beam to some extent at a transmission point, providing an automatic tracking mechanism, and the like.

FIG. 15 shows modeled micro fluctuations of the air. In a transmission path between the free space optics communication apparatus and the target apparatus, the refractive index is changed over time and has non-uniform distribution because of mixing of the air with different pressures and temperatures and the like.

For this reason, a portion W1 with high intensity and a portion W2 with low intensity are produced in a transmission beam area W. In addition, the intensity of the light beam at a point in the space is changed over time. Thus, the portion W2 with low intensity is observed as if it waved randomly in the transmission beam area W and the waving is called the micro fluctuations of the air.

The conventional free space optics communication apparatus having the light axis displacement correcting function is formed such that the light receiving surface of the light position detecting element 270 is disposed at a position shifted from a light convergent point. When the micro fluctuations are present in the air, the spot 42 formed on the light receiving surface has non-uniform distribution of light intensity.

As shown in FIG. 16, the light with non-uniform intensity distribution at a beam port (M in FIG. 15) of the apparatus corresponding to an entrance pupil is projected as it is, so that a portion with low intensity and a portion with high intensity are produced, and the center of the light intensity, different from the center of the luminous flux, is determined as the optical axis.

As a result, as shown in FIG. 16, even when the central point of the spot 42 is located at the center of the light receiving surface and no displacement of the optical axis occurs actually, the optical axis is corrected such that the spot 42 is shifted to the lower left due to the non-uniform intensity distribution. Since the optical axis direction is displaced by the angle corresponding to that position shift, the error in correcting the optical axis displacement is increased, and at worst, transmitted light does not reach the target apparatus to disable communication.

SUMMARY OF THE INVENTION

It is an object of the present invention to provide an optical axis displacement correcting function which reduces the error in correcting optical axis displacement caused by uneven intensity distribution in a received light beam, if any, and which allows stable communication even when micro fluctuations of the air occur (or to provide only an optical axis displacement detecting function).

According to one aspect for achieving the aforementioned object, the present invention provides a light detection apparatus described below. The light detection apparatus comprise a first light receiving element and a second light receiving element, a light converging optical system which converges a light flux incident from the outside to form a spot of the light flux on each of light receiving surfaces of the first and second light receiving elements, and information producing section which combines outputs from the first and second light receiving elements to produce information on positions of the spots. The spots formed on the light receiving surfaces of the first and second light receiving elements have a point-symmetrical relationship.

According to another aspect, the present invention provides a free space optics communication apparatus which performs communication with a target apparatus through a light flux propagating in space, described below. The free space optics communication apparatus comprises a first light receiving element and a second light receiving element, a light converging optical system which converges a light flux incident from the target apparatus to form a spot of the light flux on each of light receiving surfaces of the first and second light receiving elements, and information producing section which combines outputs from the first and second light receiving elements to produce information on positions of the spots. The spots formed on the light receiving surfaces of the first and second light receiving elements have a point-symmetrical relationship.

According to another aspect, the present invention provides a light detection apparatus described below. The light detection apparatus comprises a light receiving element, a light converging optical system which converges a light flux incident from the outside on each of a first light convergent point and a second light convergent point on substantially the same optical axis and forms spots of the light flux on a light receiving surface of the light receiving element, and information producing section which produces information on positions of the spots based on an output from the light receiving element. The light receiving surface of the light receiving element is placed between the first and second light convergent points.

According to another aspect, the present invention provides a free space optics communication apparatus which performs communication with a target apparatus through a light flux propagating in space, described below. The free space optics communication apparatus comprises a light receiving element, a light converging optical system which converges a light flux incident from the target apparatus on each of a first light convergent point and a second light convergent point on substantially the same optical axis and forms spots of the light flux on a light receiving surface of the light receiving element, and information producing section which produces information on positions of the spots based on an output from the light receiving element. The light receiving surface of the light receiving element is placed between the first and second light convergent points.

These and other characteristics of the light detection apparatus and the free space optics communication apparatus of the present invention will be apparent from the following description of specific embodiments with reference to the drawings.

DETAILED DESCRIPTION OF THE PREFERRED EMBODIMENTS

Preferred embodiments of the present invention are hereinafter described with reference to the drawings.

Embodiment 1

Figure 1:
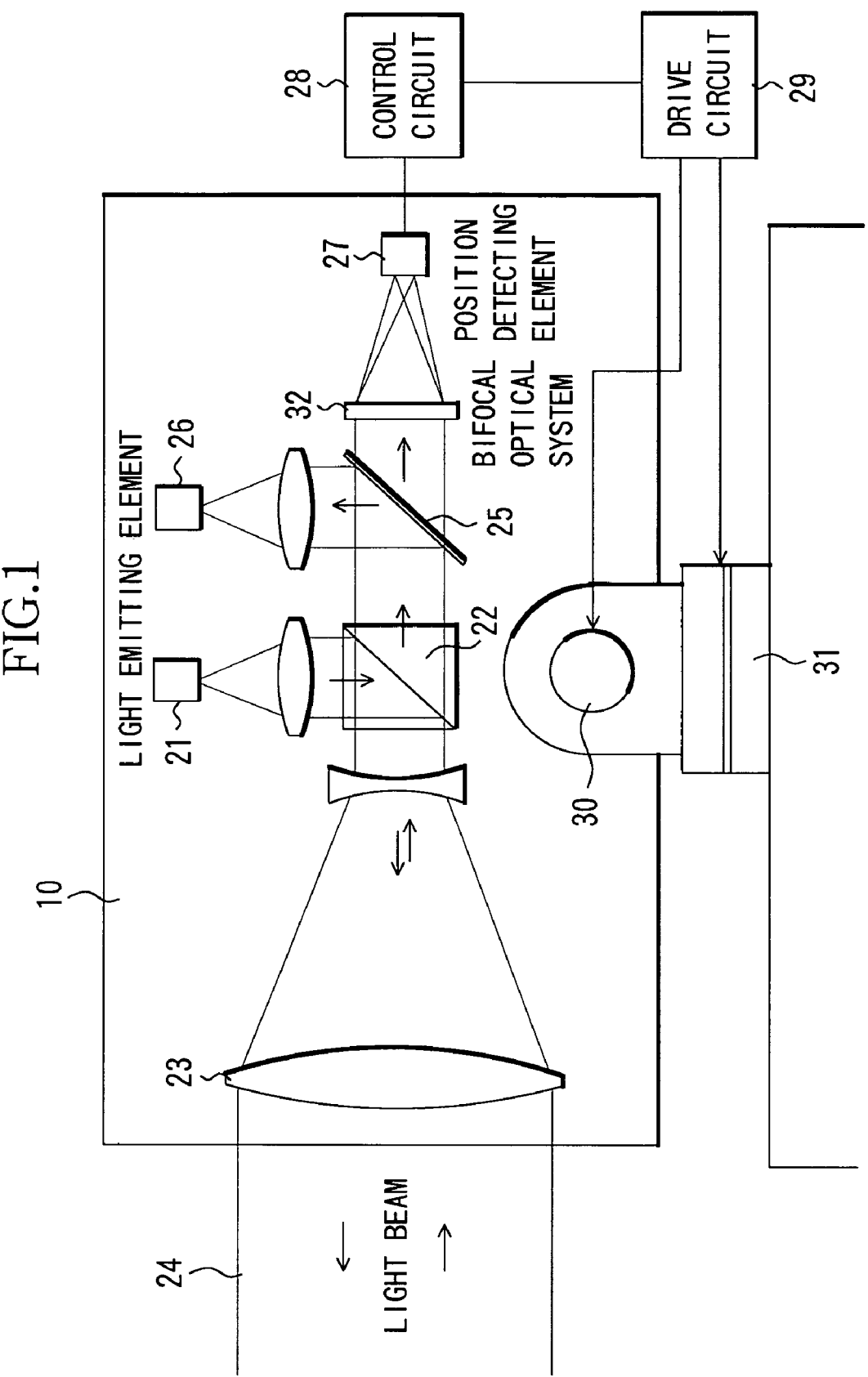
FIG. 1 is a schematic diagram showing a free space optics communication apparatus of Embodiment 1 of the present invention.

FIG. 1 shows a free space optics communication apparatus which has an optical axis displacement correcting function which is Embodiment 1 of the present invention. Reference numeral 10 shows an optical system for transmitting and receiving a light beam. Light for transmission to a target apparatus, not shown, is emitted from a light emitting element 21 such as a semiconductor laser. The light for transmission emitted from the light emitting element 21 is polarized and the polarization direction is set to be parallel with the paper. The polarization of the direction is reflected by a polarization beam splitter 22 toward a light transmission/reception lens 23 which changes the light into a generally collimated light beam 24 with slight divergence before the beam 24 is transmitted toward the target apparatus.

On the other hand, received light transmitted from the target apparatus reversely follows the path on the same optical axis as that of the transmitted light from the free space optics communication apparatus and is incident on the polarization beam splitter 22 through the light transmission/reception lens 23. Since the polarization direction is set to be orthogonal to that of the transmitted light (the polarization direction is perpendicular to the paper), the light passes through the polarization beam splitter 22 and enters a beam splitter 25.

Most of the received light is reflected by the beam splitter 25 and is incident on a light receiving element 26 for light signal detection to detect the signal for communication. Some of the received light, however, passes through the beam splitter 25, passes through a bifocal optical system 32, and forms a spot of the light on a light receiving surface of a light position detecting element 27.

Figure 2:
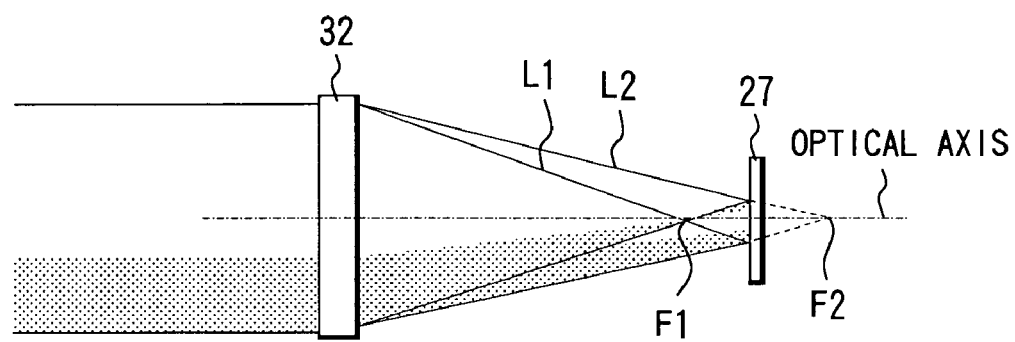
FIG. 2 shows a specific example of a bifocal optical system in the free space optics communication apparatus of Embodiment 1 of the present invention.

Next, description is made for the relationship between the bifocal optical system 32 and the light position detecting element 27 in detail with reference to FIG. 2. FIG. 2 shows that the received light passing through the bifocal optical system 32 is converged on a light convergent point F1 which is located between the light position detecting element 27 and the bifocal optical system 32 and on a light convergent point F2 which is opposed to the light correcting point F1 across the light position detecting element 27. These light convergent points F1 and F2 are placed on the optical axis.

As shown in FIG. 2, the generally collimated received light passing through the beam splitter 25 is converged on the light convergent points F1 and F2 by the bifocal optical system 32. These light convergent points F1 and F2 generally match the focal points of the received light, and the light receiving surface of the aforementioned light position detecting element 27 is disposed between these focal points.

Figure 14A:
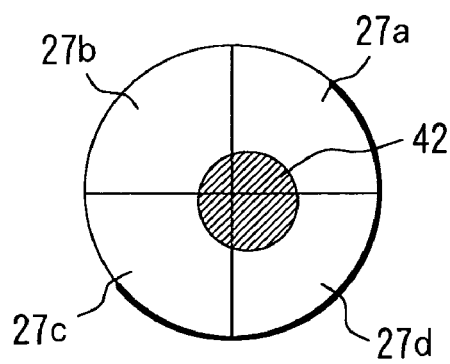
FIGS. 14A and 14B spots formed on light receiving surfaces of conventional free space optics communication apparatuses.
Figure 14B:
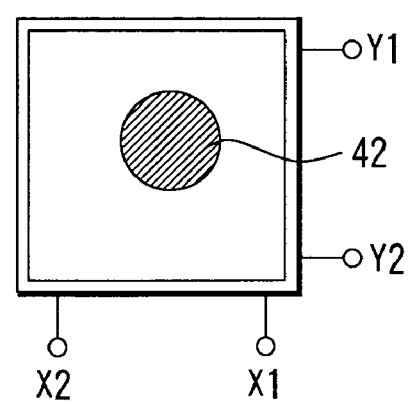
Figure 15:
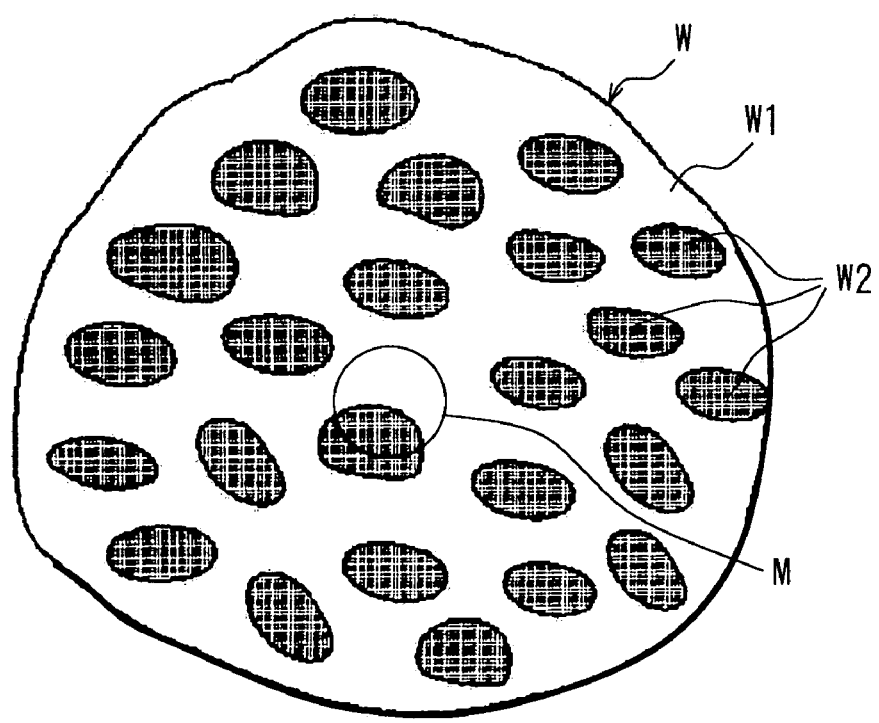
FIG. 15 shows modeled micro fluctuations of light in the conventional example.
Figure 16A:
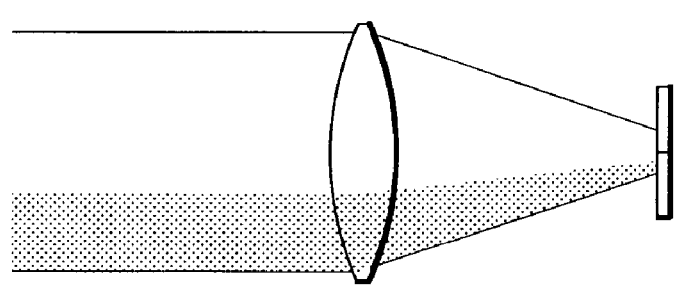
FIGS. 16A and 16B show a spot with non-uniform distribution of light intensity in the conventional example.
Figure 16B:
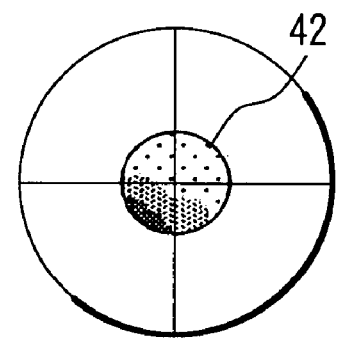

Although described in the conventional example, the light position detecting element 27 is a photodiode divided into four as shown in FIG. 14A. The light position detecting element 27 outputs a signal in accordance with the distribution of the light intensity in the spot 42 formed on the light receiving surface, and the outputs from the respective photodiodes 27a to 27d are compared. The position of the light spot 42 can thus be found.

Figure 3:
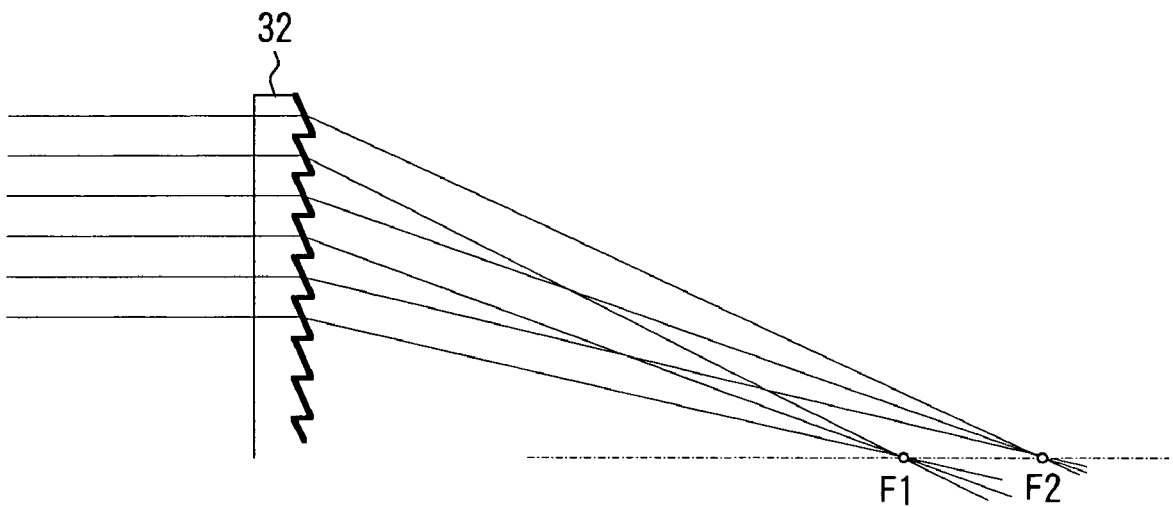
FIG. 3 shows a specific example of the bifocal optical system in the free space optics communication apparatus of Embodiment 1 of the present invention.

The bifocal optical system 32 is a Fresnel lens which has a plurality of concentric grooves formed thereon as shown in FIG. 3. The grooves are formed to have angles to converge light alternately on the focal point F1 and the focal point F2. For example, in order from the outer periphery, light passing through the outermost groove passes through the focal point F2, light passing through the second grove passes through the focal point F1, light passing through the third groove passes through the focal point F2, and so on.

Figure 4:
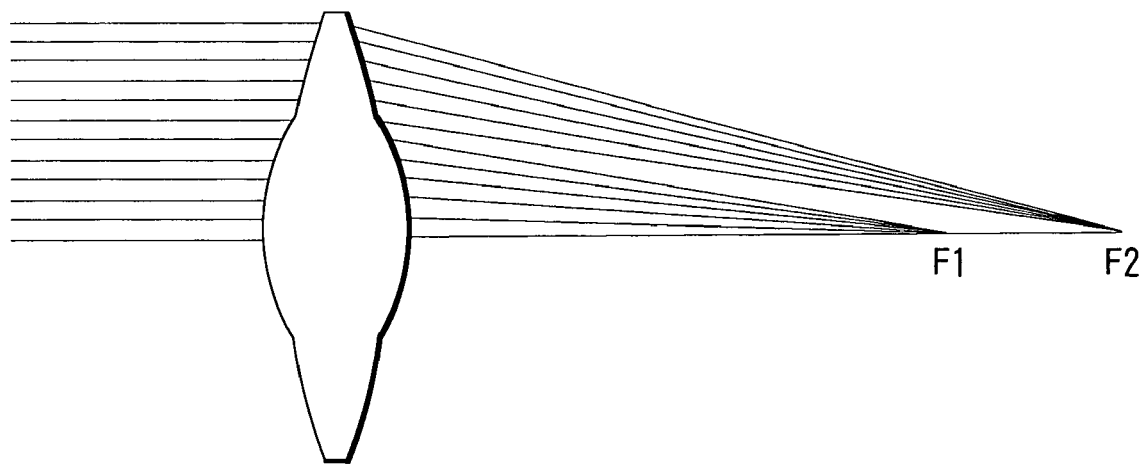
FIG. 4 shows another specific example of the bifocal optical system in the free space optics communication apparatus of Embodiment 1 of the present invention.
Figure 5:
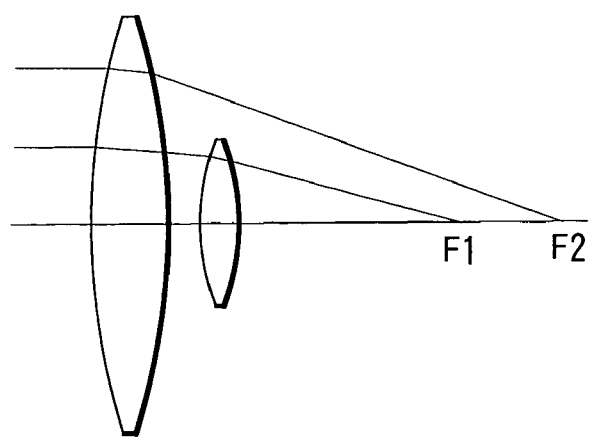
FIG. 5 shows another specific example of the bifocal optical system in the free space optics communication apparatus of Embodiment 1 of the present invention.
Figure 6:
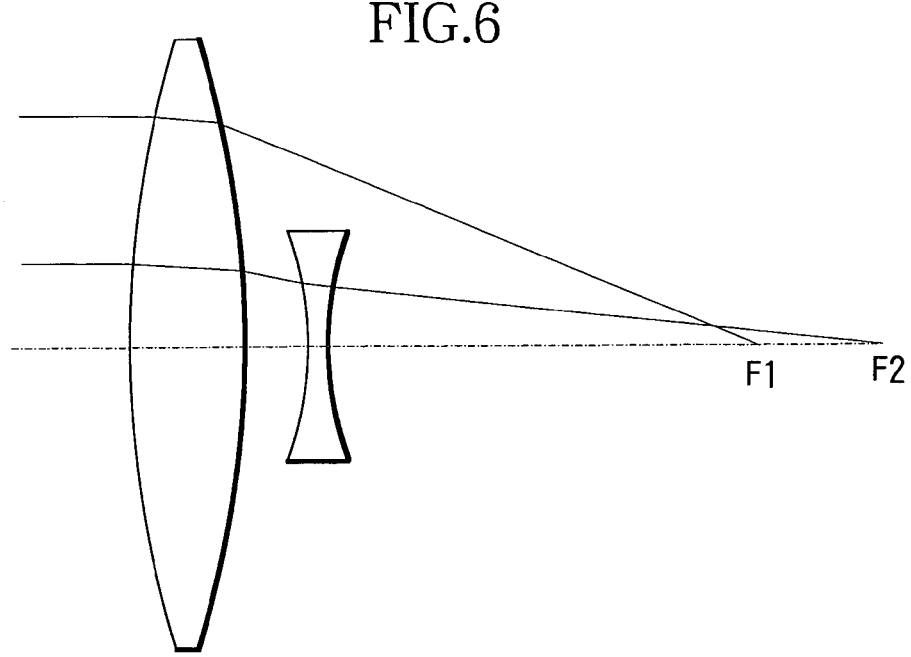
FIG. 6 shows another specific example of the bifocal optical system in the free space optics communication apparatus of Embodiment 1 of the present invention.

Another example may be a lens which has a plurality of spherical surfaces with different curvatures depending on position as shown in FIG. 4, or a plurality of lenses disposed in line in the optical axis direction as shown in FIG. 5 and FIG. 6. While the variations shown in FIGS. 4, 5, and 6 have lower accuracy in converging light to each focal point than the Fresnel lens 32 in FIG. 3, they can reduce the influence of the fluctuations of the air to half or less. In addition, since their structures are simple and easily manufactured, the cost can be reduced.

Figure 7A:
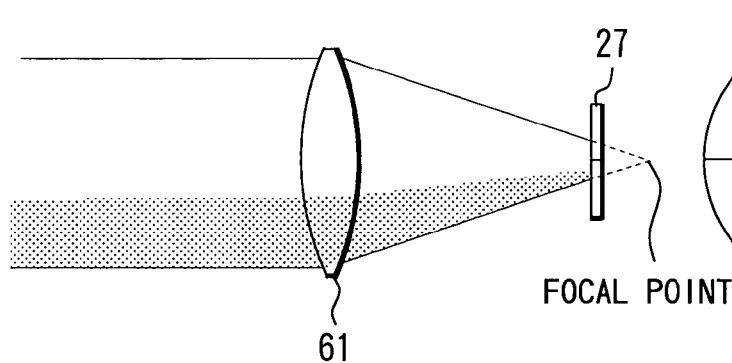
FIGS. 7A and 7B show an example of a light position detecting element in the free space optics communication apparatus of Embodiment 1 of the present invention.
Figure 7B:
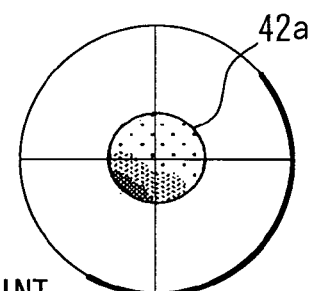

When the light receiving surface of the light position detecting element 27 is placed in front of the focal point of the light converging optical system as shown in FIG. 7A (when the light receiving surface of the light position detecting element 27 is disposed between a light converging lens 61 and the focal point), the spot formed on the light receiving surface has a shape 42a as shown in FIG. 7B. When the light receiving surface of the light position detecting element 27 is placed at the back of the focal point of the light converging optical system as shown in FIG. 8A (when the focal point is positioned between the light converging lens 61 and the light position detecting element 27), the spot formed on the light receiving surface has a shape 42b as shown in FIG. 8B.

Figure 8A:
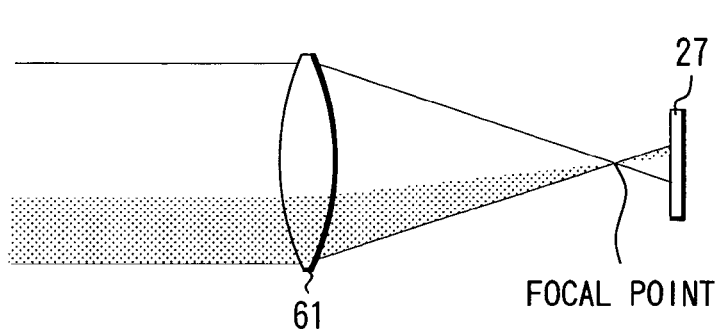
FIGS. 8A and 8B show an example of a light position detecting element in the free space optics communication apparatus of Embodiment 1 of the present invention.
Figure 8B:
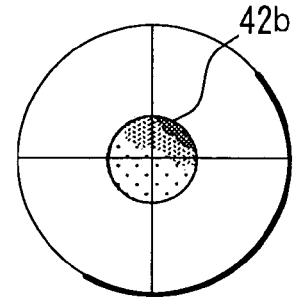

As shown from FIGS. 8A and 8B, these spots 42a and the spot 42b have point-symmetrical light intensity distribution affected by the air fluctuations and have substantially the same spot shapes. The spots are moved in the same direction when displacement of the optical axis occurs.

For this reason, when these spots 42a and 42b are superimposed, the light intensity distribution of the superimposed spots is symmetrical with respect to an arbitrary straight line passing through the center, and the center of the light flux can be matched with the center of the light intensity.

Even when the light in the spot formed on the light receiving surface has non-uniform intensity distribution due to the air fluctuations, the light position detection is not affected. If displacement of the optical axis actually occurs, the corresponding displacement of the spots can be detected accurately since the spots are moved in the same direction.

The idea of superimposing the spots in this manner is adopted in Embodiment 1. Specifically, the light receiving surface of the light position detecting element 27 is disposed at a predetermined position between the two focal points (substantially the same positions as the light convergent points F1 and F2) as shown in FIG. 2, and a light flux L1 converged on the light convergent point F1 and a light flux L2 converged to (directed to) the light convergent point F2 are superimposed, and in that state, incident on the light receiving surface of the light position detecting element 27.

The two light fluxes L1 and L2 with the non-uniform intensity distribution cancel out to cause the resultant light with uniform intensity distribution in the spot formed on the light receiving surface of the light position detecting element 27, thereby making it possible to correctly detect the optical axis of the received light.

The light position detecting element 27, which has the spot with the uniform light intensity distribution formed on the light receiving surface, outputs a signal in accordance with the light intensity distribution. A control circuit 28 calculates a drive direction and a drive amount of the optical system 10 based on the output signal and transmits the calculation results to a drive circuit 29.

The drive circuit 29 drives a drive mechanism 30 and a drive mechanism 31 based on the drive information to change the angle of the optical system 10 or the like. This realizes correction of the optical axis displacement in the free space optics communication apparatus such that the center of the spot is shifted to the center of the light receiving surface of the light position detecting element 27.

While the optical axis is corrected by changing the direction of the whole free space optics communication apparatus in Embodiment 1, the optical axis can be corrected by adjusting the angle of a mirror in a free space optics communication apparatus which transmits light for transmission in turn to a plurality of target apparatuses while the angle of the mirror is changed, by way of example.

In this manner, in the free space optics communication apparatus of Embodiment 1, the light intensity distribution can be uniformed to determine the optical axis accurately, so that displacement of the optical axis can be corrected easily.

Since the control circuit 28 controls the direction of the optical system 10 based on the signal in accordance with the light intensity distribution output from the light position detecting element 27, the optical axis of the transmitted light can be matched reliably with the optical axis of the received light by changing the direction of the optical system 10 for performing communication with the target apparatus through the light flux to realize the free space optics communication apparatus with high stability of communication.

Embodiment 2

Figure 9:
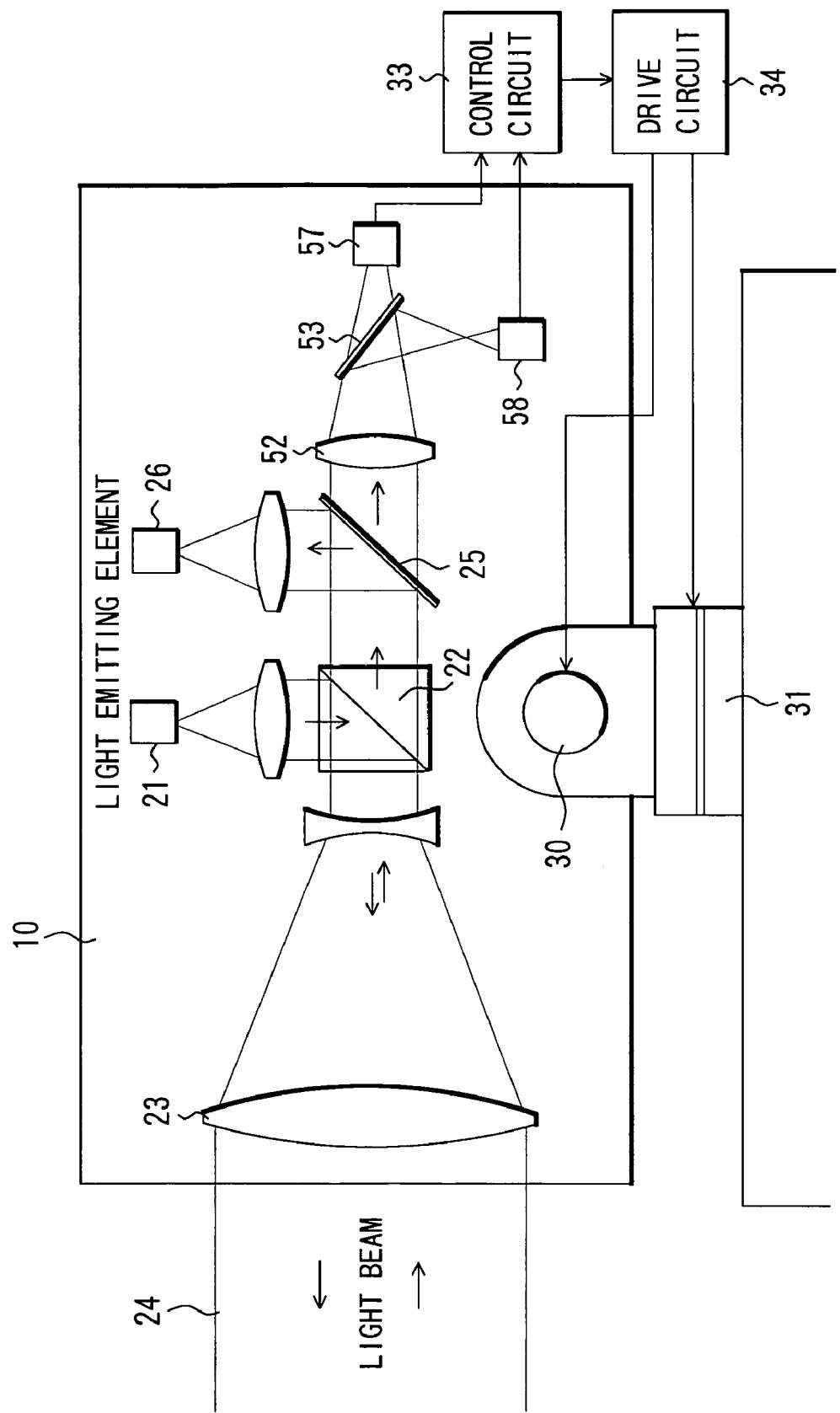
FIG. 9 is a schematic diagram showing a free space optics communication apparatus of Embodiment 2 of the present invention.

FIG. 9 shows a free space optics communication apparatus of Embodiment 2. As shown in FIG. 9, a light converging optical system 52 and a half mirror 53 are provided instead of the bifocal optical system 32 used in Embodiment 1 described above, and two light position detecting elements 57 and 58 are provided. Since the other structure in the optical system is the same as that of Embodiment 1, components identical to those in Embodiment 1 are designated with the same reference numerals and description thereof is omitted.

Figure 10:
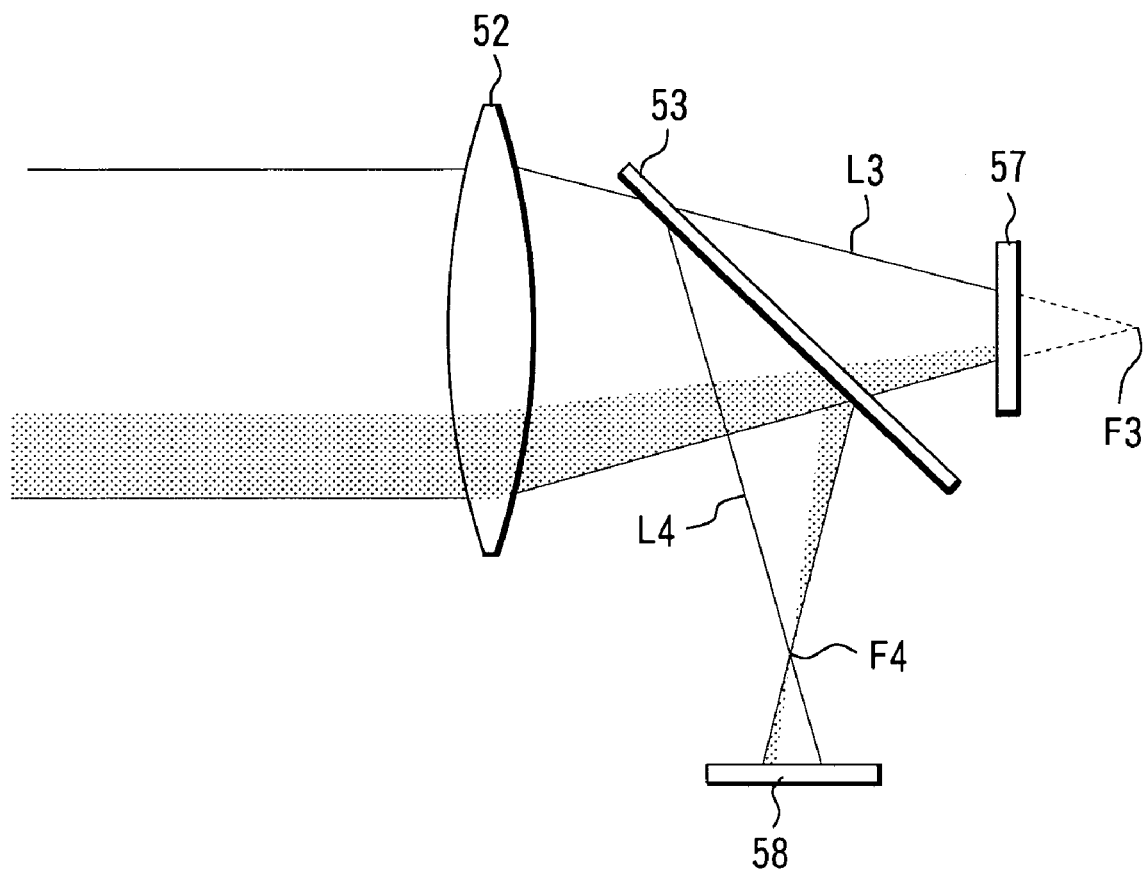
FIG. 10 shows a characteristic portion of the free space optics communication apparatus of Embodiment 2 of the present invention in detail.

As shown in FIG. 10, received light passing through a beam splitter 25 is collected by the light converging optical system 52 and is incident on the half mirror 53. Of the received light incident on the half mirror 53, light flux L3 passes through the half mirror 53 and the other light flux L4 is reflected toward a light detecting element 58 to divide the optical axis of the received light into two.

The light flux L3 passing through the half mirror 53 is incident on the light position detecting element 57 disposed between a light convergent point F3 of the light flux L3 and the half mirror 53 to form a spot on the light receiving surface of the light position detecting element 57. On the other hand, the light flux L4 reflected by the half mirror 53 is incident on the light position detecting element 58 disposed at the back of a light convergent point F4 of the light flux L4 to form a spot on the light receiving surface of the light position detecting element 58.

FIG. 7B and FIG. 8B also show the spots formed on the light receiving surfaces of the respective light detecting elements 57 and 58. Similarly to Embodiment 1, the respective spots 42a and 42b are symmetrical with respect to a point, so that signals output from the respective light position detecting elements 57 and 58 can be superimposed to uniform the intensity distribution of the received light.

Figure 11:
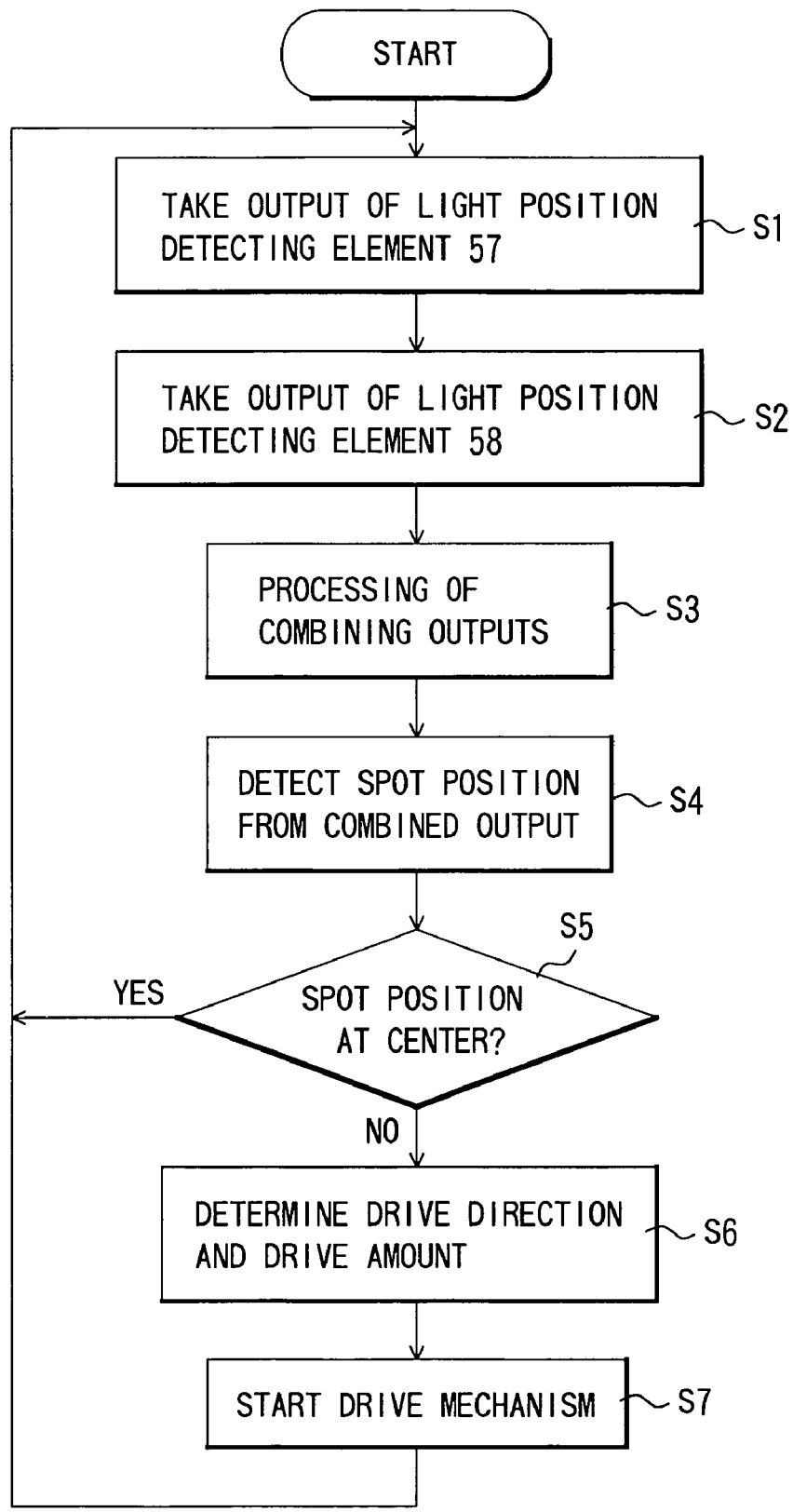
FIG. 11 is a flow chart showing drive control of a correction mechanism in the free space optics communication apparatus of Embodiment 2 of the present invention.

Next, description is made for a controller which combines the signals output from the respective light position detecting elements 57 and 58 to control an optical axis correcting mechanism with reference to a flow chart of FIG. 11. It should be noted that the procedure shown in the flow chart is performed by a control circuit 33.

First, the control circuit 33 takes the signal output from the light position detecting element 57 and the signal output from the light position detecting element 58 (step 1 and step 2). Then, these output signals are combined (step 3), and the position of the spot is detected from the combined output (step 4).

Since the spots formed on the light receiving surfaces of the respective light position detecting element 57 and 58 are symmetrical with respect to a point as described above, the light intensity distribution is averaged by combining the output signals. Thus, there is no possibility that occurrence of optical axis displacement is determined although the central point of the spot 42 is positioned at the center of the light receiving surface as in the conventional example.

When the position of the spot is detected, it is determined whether or not the central point of the spot 42 is at the center of the light receiving surface (step 5). If the spot is not at the center, the displacement amount of the spot is calculated to arithmetically determine a drive direction and a drive amount of the optical system 10 in accordance with the calculated displacement amount (step 6). The drive information is transmitted to a drive circuit 34. Drive sections 30 and 31 driven by the drive circuit 34 correct the optical axis (step 7).

When it is determined that the spot is positioned at the center at step 5 or when step 7 is completed, the flow returns to step 1 to repeat the aforementioned routine.

It should be noted that light detecting element 57 may be disposed such that the light convergent point F3 of the light flux L3 is positioned between the half mirror 53 and the light detecting element 57 and the light detecting element 58 may be disposed between the light convergent point F4 of the light flux L4 and the half mirror 53.

Embodiment 3

Figure 12:
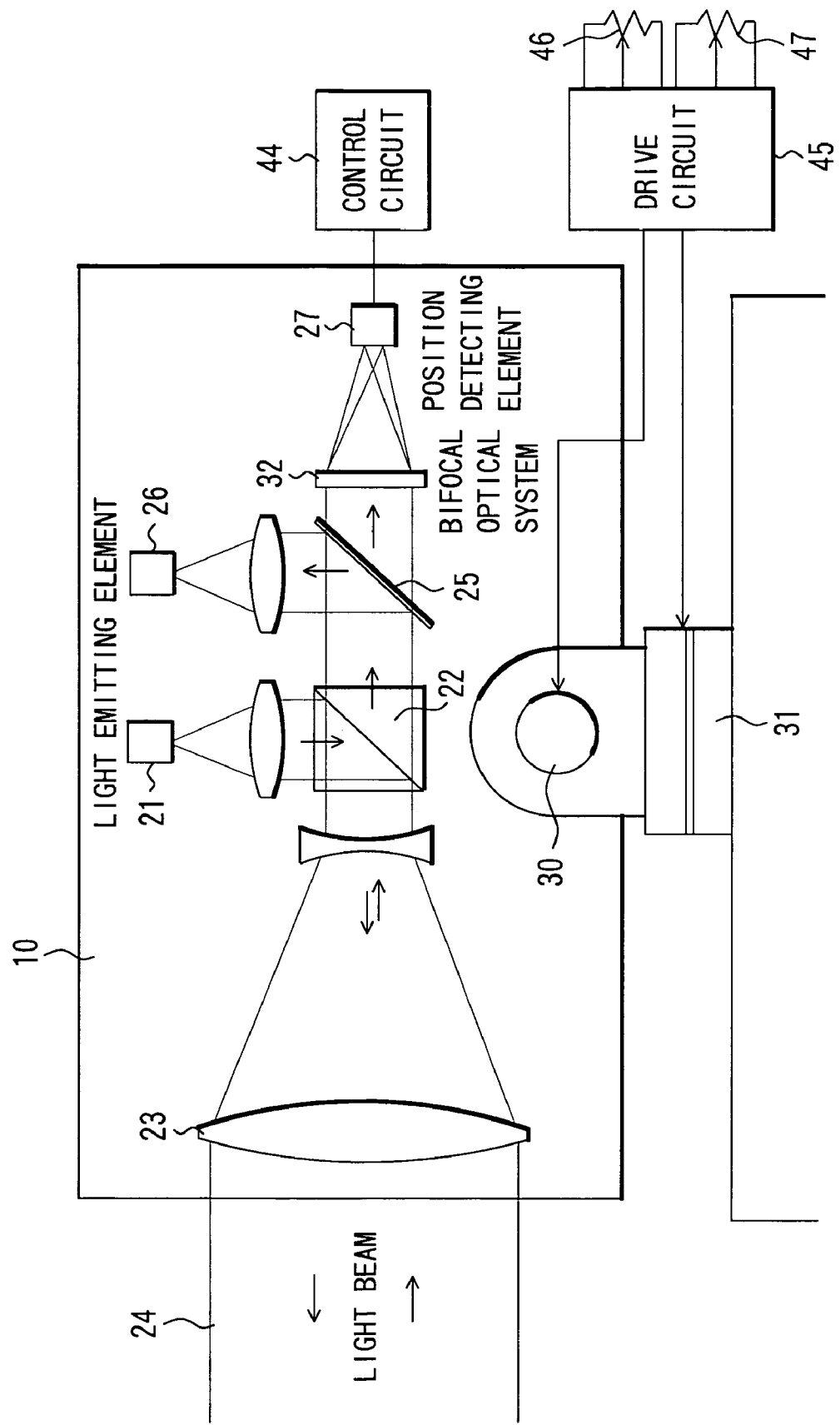
FIG. 12 is a schematic diagram showing a free space optics communication apparatus of Embodiment 3 of the present invention.
Figure 13:
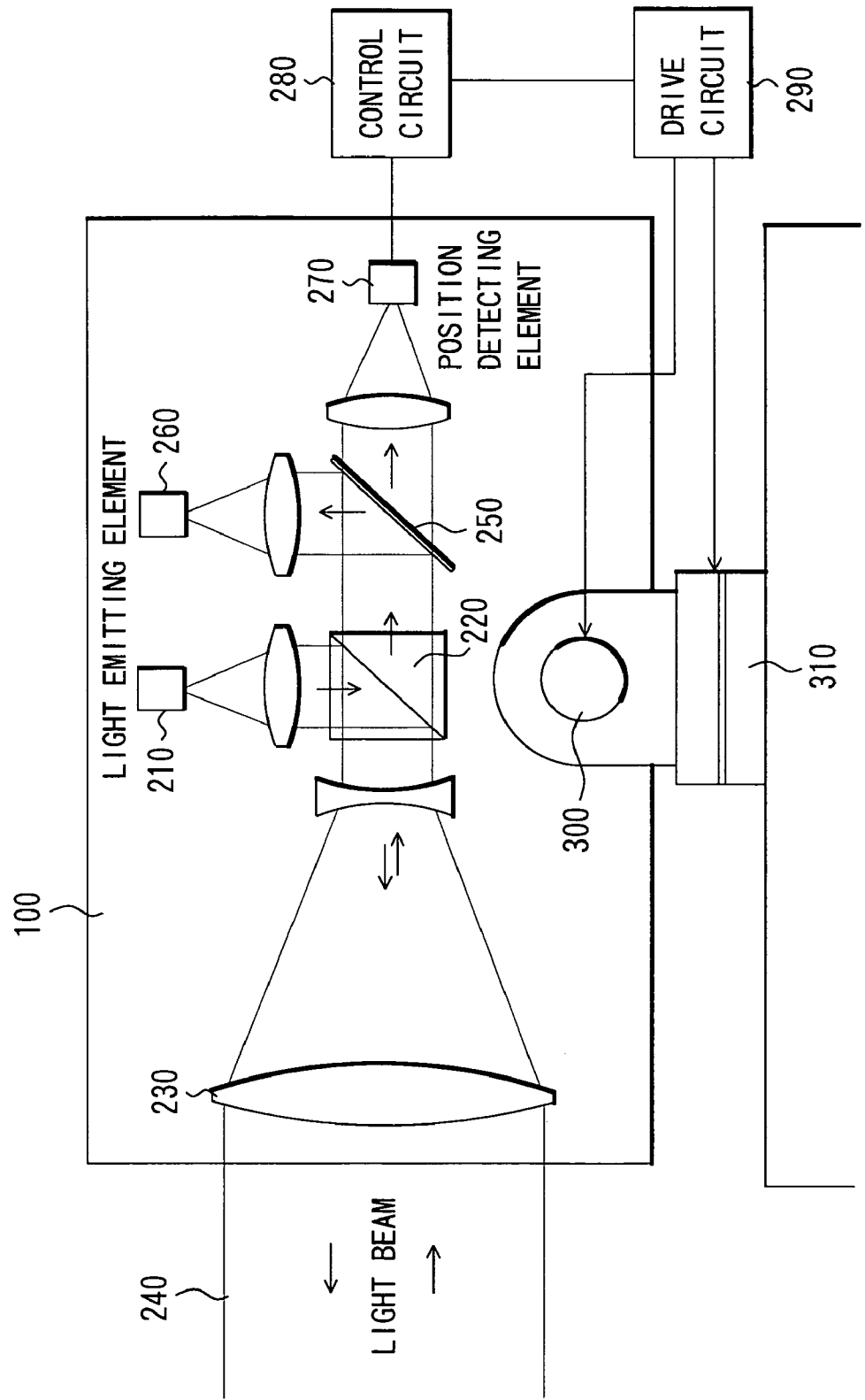
FIG. 13 is a schematic diagram showing a conventional free space optics communication apparatus.

FIG. 12 shows a free space optics communication apparatus of Embodiment 3. FIG. 12 is a schematic diagram of the free space optics communication apparatus of Embodiment 3.

In Embodiment 1 described above, the drive mechanism 30 and the drive mechanism 31 are driven on the basis of the drive direction and the drive amount obtained from the signal indicating the position of the spot output from the light position detecting element 27, and the optical axis displacement is corrected automatically such that the center of the spot is shifted to the center of the light receiving surface of the light position detecting element 27.

In contrast, in Embodiment 3, a spot formed on a light receiving surface of a light position detecting element 27 is displayed on a display 44 to correct an optical axis manually. Since the structure of an optical system 10 is the same as that of Embodiment 1, components identical to those in Embodiment 1 are designated with the same reference numerals and description thereof is omitted.

The spot formed on the light receiving surface of the light position detecting element 27 is displayed on the display 44 in the state where a displacement amount from the center of the light receiving surface can be recognized visibly. An operator manually operates a manipulation mechanism of the optical system 10 to shift the center of the spot to the center of the light receiving surface while viewing the display.

The manipulation mechanism of the optical system 10 is described. Reference numeral 30 shows a drive mechanism which drives the optical system 10 in a vertical direction, and 31 a drive mechanism which drives the optical system 10 in a horizontal direction. The drive mechanisms 30 and 31 are coupled to manipulation sections 46 and 47 through a drive circuit 45, respectively. The manipulation section 46 is operated to drive the drive mechanism 30, while the manipulation section 47 is operated to drive the drive mechanism 31.

With the structure, the operator can operate the manipulation sections 46 and 47 while viewing the display 44 to perform optical axis correction such that the spot is located at the center of the light receiving surface.

In this case, similarly to Embodiment 1, a bifocal optical system 32 is used and thus the indication values do not vary due to the air fluctuations. This facilitates the work to allow a correct optical axis adjustment. The optical axis adjustment is desirably performed when the apparatus is installed or at the time of maintenance.

The free space optics communication apparatus of Embodiment 3 is effective when it is placed at a short transmission distance from a target apparatus and a cost reduction is strongly desired.

It is possible that the apparatus of Embodiment 3 is applied to Embodiment 2 and the position of the spot can be adjusted manually while the combined spot displayed on the display 44 is viewed.

While preferred embodiments have been described, it is to be understood that modification and variation of the present invention may be made without departing from the scope of the following claims.

While preferred embodiments have been described, it is to be understood that modification and variation of the present invention may be made without departing from the scope of the following claims.

"This application claims priority from Japanese Patent Application No. 2003-412522 filed on Dec. 10, 2003, which is hereby incorporated by reference herein."

What is claimed is:

1. A free space optics communication apparatus which performs communication with a target apparatus through a light flux propagating in space, comprising:
    an optical system which includes a light receiving element;
    a light converging optical system which guides the light flux incident from the target apparatus to a light receiving surface of the light receiving element;
    a drive mechanism which drives the optical system; and
    a drive circuit which controls the drive mechanism based on output from the light receiving element, wherein
    the light converging optical system converges the light flux incident from the target apparatus on each of a first light convergent point and a second light convergent point on substantially a same optical axis,
    the light receiving surface of the light receiving element is placed between the first and second light convergent points in a direction of the optical axis such that a spot formed on the light receiving surface by the light flux passing through the first light convergent point and a spot formed on the light receiving surface by the light flux directed toward the second light convergent point have substantially the same sizes, and
    the drive circuit controls the drive mechanism based on information on position of the spot on the light receiving surface.

2. The free space optics communication apparatus according to claim 1, further comprising:
    a communication optical system which performs communication with the target apparatus through the light flux; and
    a controller which controls a direction of the communication optical system or of the free space optics communication apparatus based on the information.

3. The free space optics communication apparatus according to claim 2, wherein the light converging optical system forms the spots by using part of the light flux incident on the communication optical system.

4. The free space optics communication apparatus according to claim 1, wherein the light receiving element includes photodiodes divided into at least four pieces, and
    the free space optics communication apparatus further comprises an information producing section which produces information on position of the spot based on outputs from the at least four pieces of the photodiodes of the light receiving element.

5. The free space optics communication apparatus according to claim 1, wherein the light converging optical system is fresnel lens.

* * * * *